United States Patent [19]
Clarke, Jr. et al.

[11] Patent Number: 5,949,301
[45] Date of Patent: Sep. 7, 1999

[54] CONTROLLING THE DIRECTION OF BROADBAND ENERGY FLOW THROUGH COMPONENTS IN NETWORKING SYSTEMS

[75] Inventors: Edward Payson Clarke, Jr., Ossining; Robert Alan Flavin, Yorktown Heights, both of N.Y.; Geoffrey Hale Purdy, Roxbury, Conn.; Perwaiz Nihal, Fishkill; Norbert George Vogl, Mahopac, both of N.Y.

[73] Assignee: International Business Machines Corporation, Armonk, N.Y.

[21] Appl. No.: 08/975,352

[22] Filed: Nov. 20, 1997

[51] Int. Cl.$^6$ ................................ H01P 1/10; H01P 5/04
[52] U.S. Cl. ..................... 333/101; 333/111; 333/136
[58] Field of Search .................... 333/100, 101, 333/104, 105, 108, 109, 111, 117, 136

[56] References Cited

U.S. PATENT DOCUMENTS

| | | | |
|---|---|---|---|
| 4,258,341 | 3/1981 | Snyder | 333/109 |
| 4,935,709 | 6/1990 | Singer | 333/101 |
| 5,146,190 | 9/1992 | Firmain | 333/101 X |
| 5,465,393 | 11/1995 | Frostrom et al. | 333/109 X |

FOREIGN PATENT DOCUMENTS

| | | | |
|---|---|---|---|
| 1-274501 | 11/1989 | Japan | 333/101 |

OTHER PUBLICATIONS

Blonder Tongue Laboratories, Inc. Full Line Catalog, Old Bridge, NJ 08857, 4 pages, Oct. 1996.

Remote Electronic RF Sensing Coax Switch Kit, Viewsonics, Inc., Boca Raton, Florida 33487, 2 pages.

Scientific Atlanta Product Information, 1–800–722–2009, 1 page, Nov. 1997.

Electroline, Test Point Selector (models TPS–MS & TPS–SL, Equipement Electroline Equipment Inc., Montreal, Quebec, Canada H1Z3E4, 3 pages, Nov. 1997.

*Primary Examiner*—Robert Pascal
*Assistant Examiner*—Barbara Summons
*Attorney, Agent, or Firm*—Louis J. Percello

[57] ABSTRACT

The present invention is a switching system for a broadband network operating above five megahertz. The system connects to a first and second network through appropriate network connections. There are four components in the switching network. A first component with a first common connection, a first A branch, and a first B branch, the first common connection is connected to the first network terminal. A second component has a second common connector and a second A and B branch. The second common connector is connected to the second network terminal. The third component has a third A and B branch and one third common connector. The third A branch is connected to the first A branch. The third B branch is connected to the second B branch. The third common connector is connected to a first device terminal of a device. The fourth component has a fourth A and B branch and a fourth common connector. The fourth B branch is connected to the second B branch. The fourth common connector is connected to a second device terminal of the device. The fourth A branch is connected to the first A branch. One or more of the first, second, third and fourth components is chosen to be a switch or splitter and configured to change the flow of electromagnetic power through the first and second terminals of the device and the first and second network terminals.

24 Claims, 8 Drawing Sheets

CONTROLLING THE DIRECTION OF BROADBAND ENERGY FLOW THROUGH COMPONENTS IN NETWORKING SYSTEMS

FIELD OF THE INVENTION

This invention relates to the field of broadband networks. More specifically, the invention relates to switching inputs and outputs of broadband network components.

BACKGROUND OF THE INVENTION

Broadband networks are systems of network components which receive and/or transmit broadband signals where the signals are analog wave forms within the 5 MHz (megahertz) to 1 GHz (gigahertz) frequency range; contain information encoded with analog modulation; and are combined through multiplexing (typically, frequency division multiplexing). These network components are interconnected through network connections. Examples of broadband networks include CATV/MATV (Community Access Television, Multiple Access Television) systems and data networks. A CATV/MATV system is typically composed of one or more "head-ends" which deliver television channels to a community of homes over an HFC (hybrid-fiber coax) infrastructure. The network components in a CATV/MATV broadband network include RF (radio-frequency) modulators, RF demodulators, frequency translators, band-pass filters, band-trap filters, combiners, splitters, taps, attenuators, equalizers, amplifiers, broadband switches, fiber-optic nodes, and metering equipment. These components are connected to each other through transmission lines, typically coaxial cable.

The CATV/MATV systems are said to be broadband networks because the information which flows between the CATV/MATV network components is encoded in analog signals within the 5 MHz to 1 GHz range. The RF modulator components receive analog or digital signals containing information (such as audio and video information or digital data) in the baseband spectrum (below 5 MHz) and modulate the signals into the broadband spectrum. Each individual RF modulator will typically restrict the modulation of its input signals to within a six megahertz band, or television channel; of the broadband spectrum. Television channel 2, for instance, is the band of broadband spectrum between 54 MHz and 60 MHz. A television channel 2 modulator will modulate its audio and video into this range so that a connected television receiver (demodulator) can receive it. Demodulators listen to network connections for modulated signals within the broadband spectrum and convert the modulated signal into one or more demodulated output signals. The frequency range which the demodulators listen to is typically coordinated with the frequency range that one or more modulators are broadcasting on so that a demodulator tuned to the spectrum range of 54 MHz to 60 MHz (channel 2), for instance, will demodulate and output the signals (such as audio and video or data signals) which were modulated by a connected channel 2 modulator. A fiber-optic node is another network component which generates and receives broadband information. These nodes up-convert signals on a given range of the broadband spectra (such as 5 MHz to 50 MHz) into the optical frequency spectrum for transmission over optical media such as fiber-optic cable. The nodes can also receive signals on a given range in the optical frequency spectrum and down-convert the signals into the broadband spectrum for transmission over a broadband network. Fiber-optic nodes are often used to interconnect with optical fiber, two or more broadband networks which are separated over long distances.

Many of the network components are directional in nature, that is, they receive broadband signals, perform a function over the broadband spectrum, and retransmit the altered signals. Frequency translators translate the signals in a given range of the broadband spectrum into a second range of the broadband spectrum. Amplifiers are used to rejuvenate signals which have decayed due to transmission losses. Band-pass filters attenuate signals (typically noise) in a given range of the broadband spectrum and attenuators attenuate signals over the entire broadband spectrum. Equalizers compensate for frequency dependent decay of signals over long distances of transmission lines (network connections).

Metering devices are network components which monitor and measure broadband signals. Examples of metering devices include spectrum analyzers and signal level meters.

RF switches are network components which selectively switch on or off the electric connectivity of network connections. An A/B RF switch, for example, has one common (input) network connector and two branch (output) connectors and can connect the common connector to either of the branch connectors. RF switches are available in different configurations with varying numbers of common (input) and branch (outputs) connectors. The AB-4, stock no. 4017, made by Blonder Tongue Laboratories, Inc. is a manual RF switch which has one common connector, two branch connectors, and is controlled through a push-button. Pushing the button, toggles the common connector between being connected to the first branch connector and the second. The VSESC-1 "Basic Coax Switch" made by Viewsonics, Inc. is an A/B RF switch which is controlled by applying DC voltage to a control line. When +12 VDC is present on the control line, the switch connects its common connector to one of its branch connectors. In the absence of the voltage, the switch connects its common connector to the other branch. Further, the "ClearPath Test Point Selector" (TPS) made by Electroline Systems, Inc. is an RF switch with eight branch connectors and one common connector. The TPS operates on the return bandwidth (5–40 MHz) of the broadband spectrum and can switch any one of the branches to its common. In contrast to the AB-4, the TPS is an addressable switch; it can be controlled remotely through an FSK (Frequency Shift Keying) modulated signal in the broadband spectrum. Currently, RF switches are employed at the periphery of the network to provide controllable connections to subscribers (turn service to a subscriber on or off); at strategic points in a cable plant to isolate and/or attenuate signals going to/coming from specific neighborhoods; and in the head-end of the cable plant to selectively switch metering devices into the broadband network. See http://www.electrolinequip.com on the World-Wide-Web, or the Electroline ClearPath product literature for more details. RF switches are usually constructed of discrete components including limited lifetime relays.

STATEMENT OF PROBLEMS WITH THE PRIOR ART

With the growing deployment of data networks over broadband systems, there is an increased need for stability, reliability, and availability. To be able to meet these needs, there needs to be redundant delivery points in the network. The prior art does not disclose an effective way to manage the flow of electromagnetic power around, to, or through one or more network components. In particular, the prior art does not disclose an effective way to reverse the direction of the flow of electromagnetic power through a network component. In modern CATV networks, engineers will manually connect, disconnect, or otherwise reconfigure the connections to a network component when there is a failure in a network component or connection (such as a break in a coaxial cable line) and a need to redirect the flow of electromagnetic power to, around, or through the network component/connection.

OBJECTS OF THE INVENTION

A broadband switching system which manages the energy flow through a component between two connected networks.

An object of this invention is a broadband switching system that can reverse the direction of signals on a broadband network.

SUMMARY OF THE INVENTION

The present invention is a switching system for a broadband network operating above five megahertz. The system connects to a first and second network through appropriate network connections and consists of four components. A first component with a first common connector, a first A branch, and a first B branch, connected to the first network terminal through the first common connector. A second component has a second common connector and a second A and B branch. The second common connector is connected to the second network terminal. The third component has a third A and B branch and one third common connector. The third A branch is connected to the first A branch. The third B branch is connected to the second B branch. The third common connector is connected to a first device terminal of a device. The fourth component has a fourth A and B branch and a fourth common connector. The fourth B branch is connected to the second B branch. The fourth common connector is connected to a second device terminal of the device. The fourth A branch is connected to the first A branch. One or more of the first, second, third and fourth components is chosen to be a switch or splitter and configured to change the flow of electromagnetic power through the first and second terminals of the device and the first and second network terminals.

BRIEF DESCRIPTION OF THE DRAWINGS

The foregoing and other objects, aspects and advantages will be better understood from the following detailed description of preferred embodiments of the invention with reference to the drawings that are include the following.

DETAILED DESCRIPTION OF THE INVENTION

Figure 1:
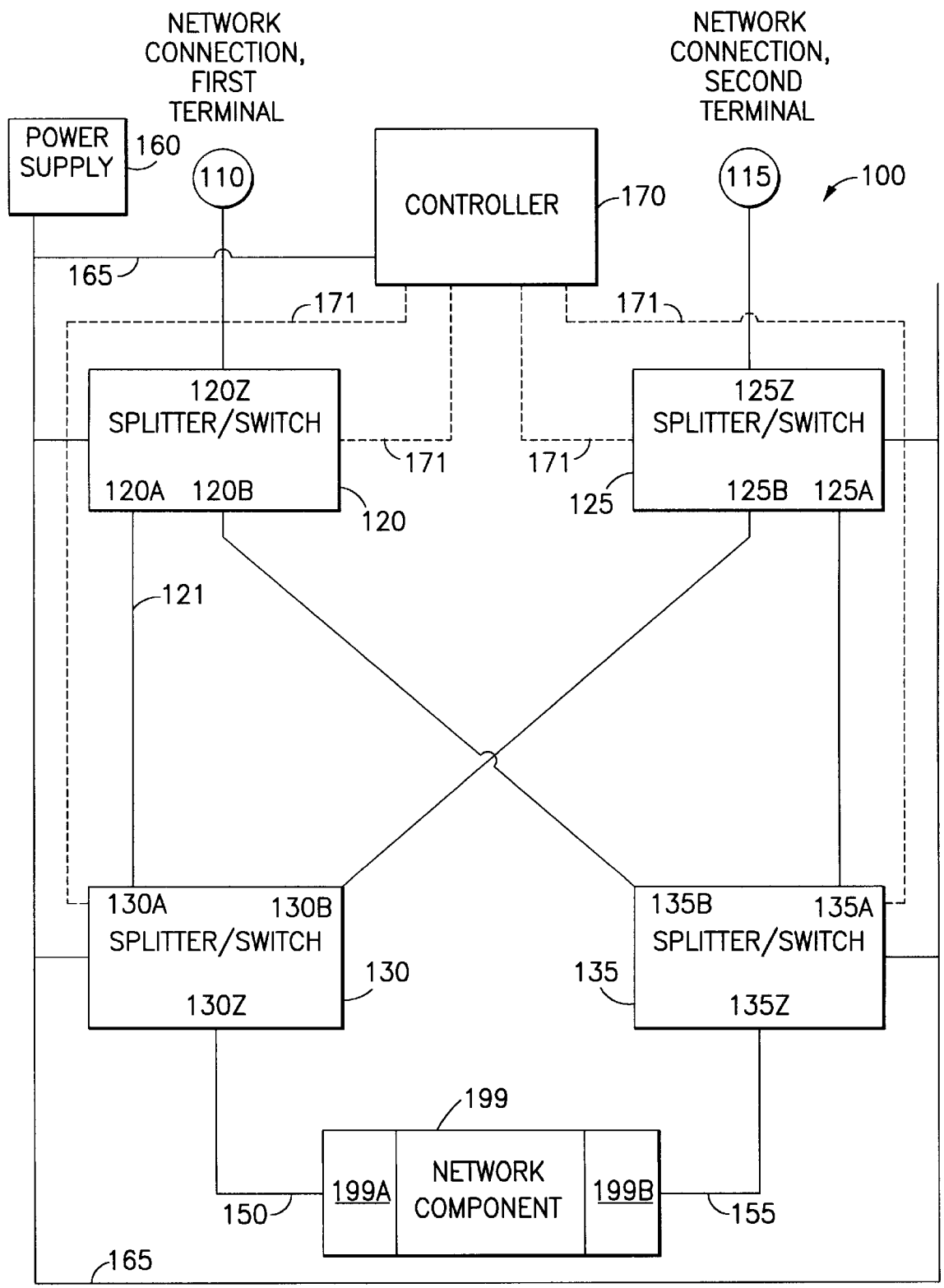
FIG. 1 is a block diagram of a system of broadband switches that permits changing the flow of electromagnetic power of broadband signals by remote or local control.
Figure 2:
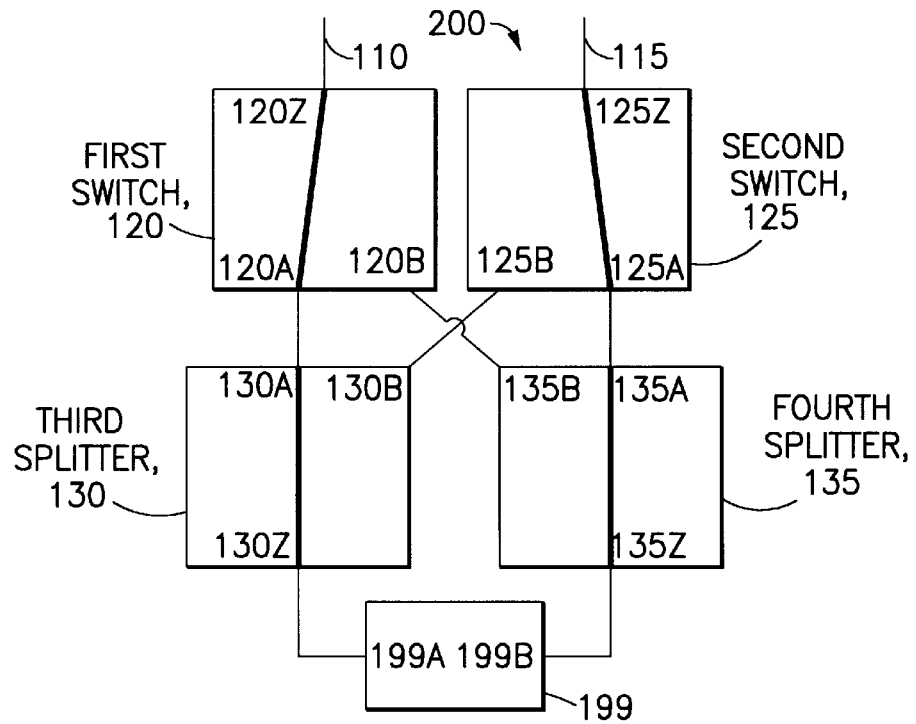
FIGS. 2 through 5 show various configurations of a switching system where the first two components are switches and the second two are splitters.
Figure 3:
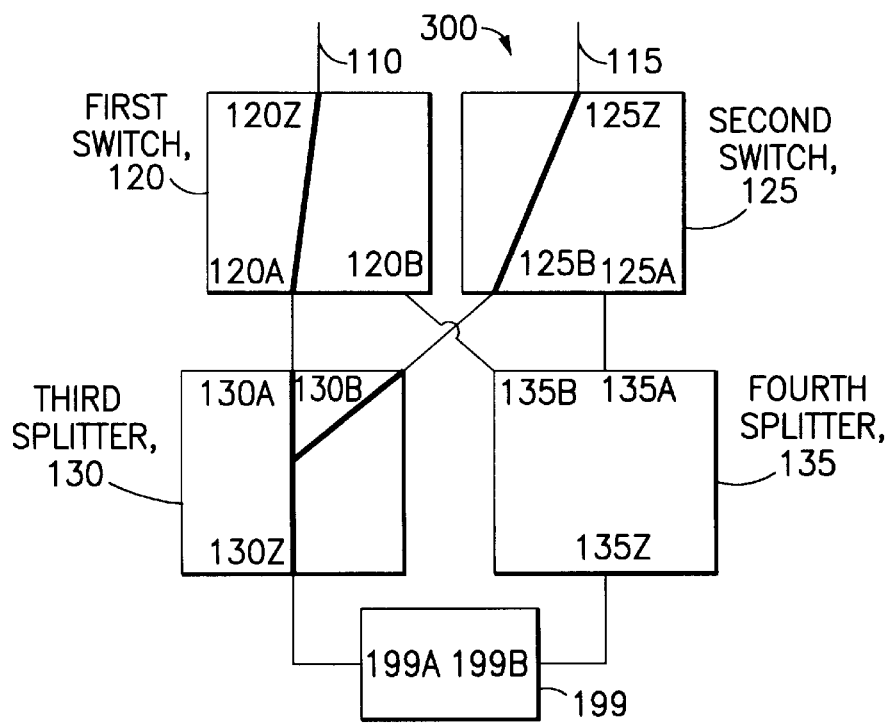
Figure 4:
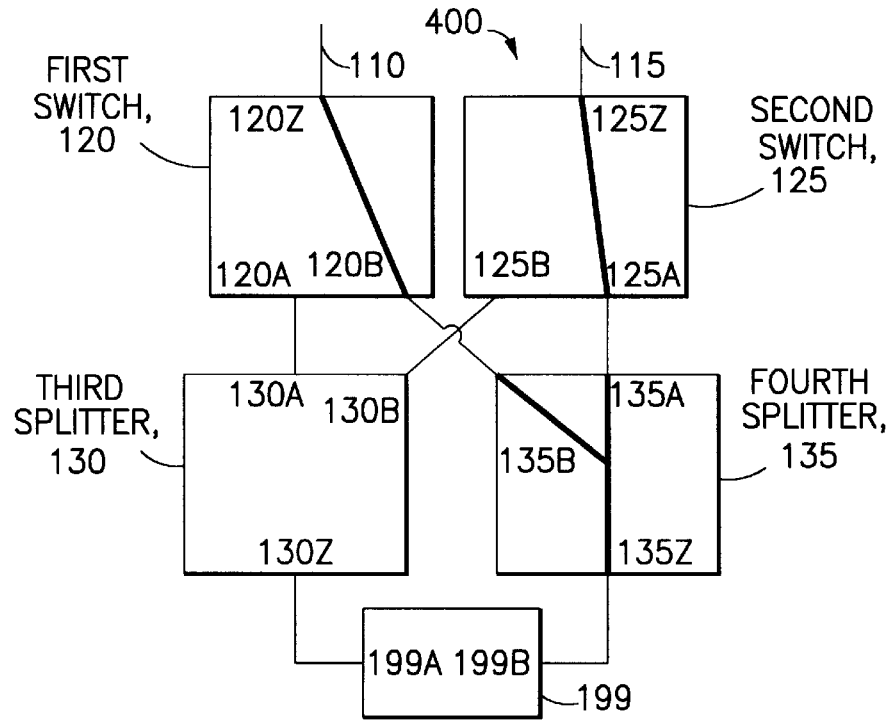
Figure 5:
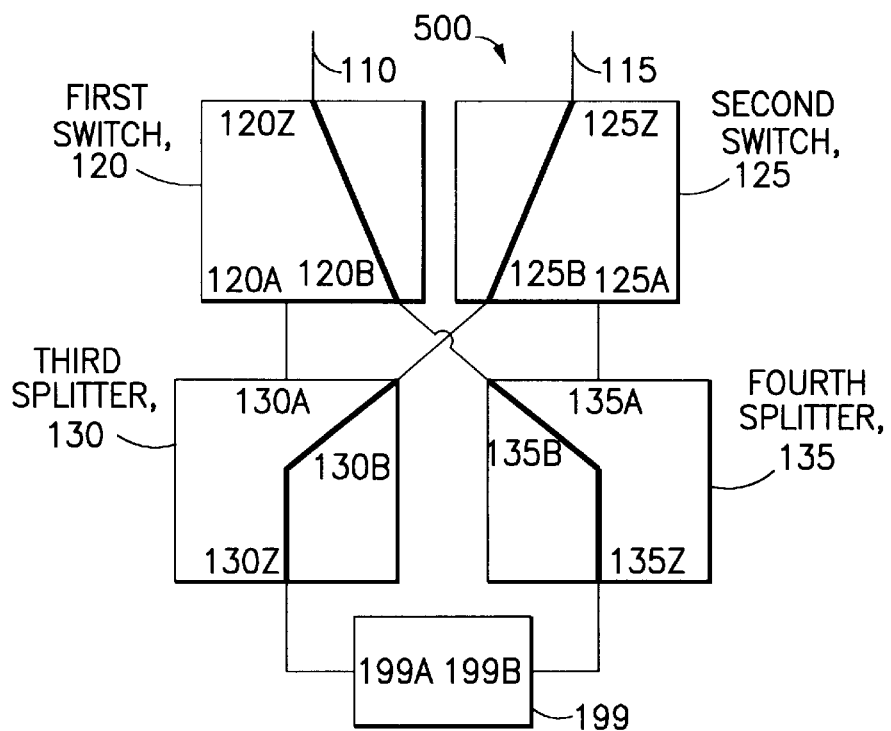
Figure 6:
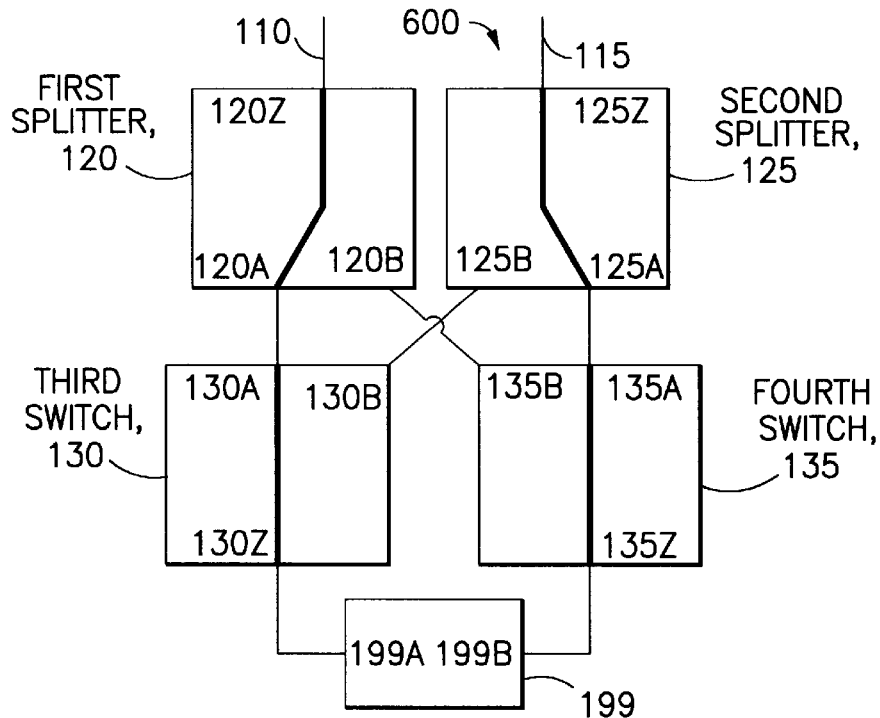
FIGS. 6 through 9 show various configurations of a switching system where the first two components are splitters and the second two are switches.
Figure 7:
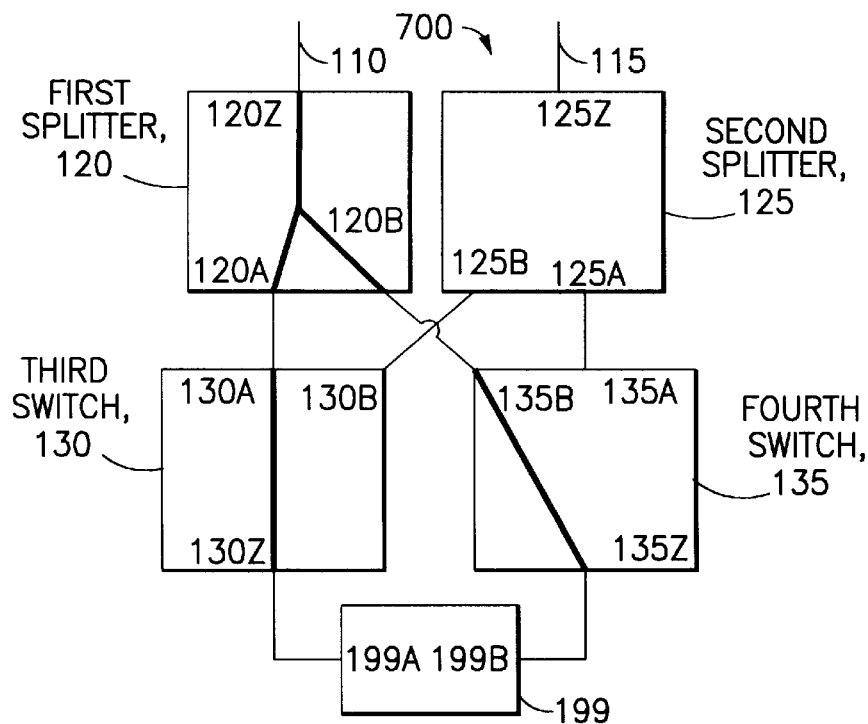
Figure 8:
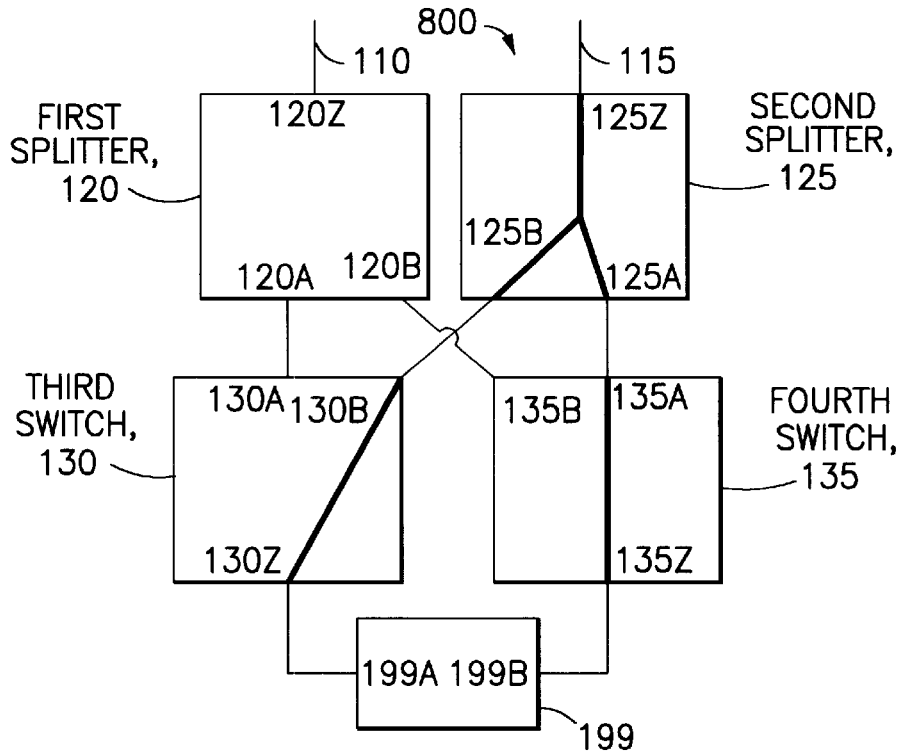
Figure 9:
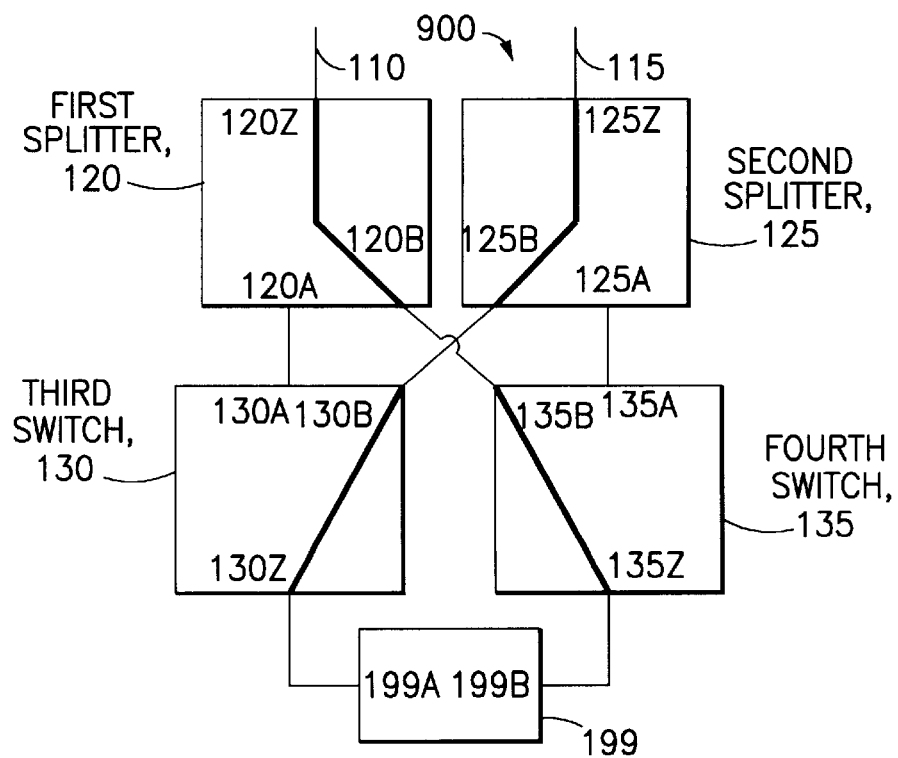

FIG. 1 is a block diagram of a system 100 of broadband switches and/or splitters that permits controlling and/or reversing directions of electromagnetic power by remote or local control. This system 100 has two network connections, 110 and 115, and a network component 199 which can be physically connected to network connections through connectors 199A and 199B. Through computer or manual control, the system 100 can control the connections of the network component 199 so that its first connector 199A can be connected to none, one, or both of the network connections (110 and 115) and its second connector 199B can also be connected to none, one, or both of the network connections (110 and/or 115). As described below, FIGS. 2 through 10 and FIG. 13 show various configurations of this system 100.

The network connections 110 and 115 are each connected to the common connectors (120Z, 125Z) of blocks 120 and 125, respectively. Blocks 120, 125, 130 and 135 are broadband switches and/or splitters. These switches/splitters 120, 125, 130 and 135, each have one connector (120Z, 125Z, 130Z and 135Z respectively) called a common connector and two connectors (120A and 120B, 125A and 125B, 130A and 130B, and 135A and 135B respectively) called branch connectors. The switches are capable of electrically connecting their respective common connectors (120Z, 125Z, 130Z, 135Z) to either of their branch connectors. The switches also electrically terminate the unconnected branch. For example, if switch 120 is set to switch the common connector 120Z to the first branch connector 120A, the second branch connector 120B will be terminated. This termination is necessary to avoid reflections and interference of signals in the broadband spectrum. Switches such as these are well known and widely available and include the "ClearPath Test Point Selector" made by Electroline, Inc., the AB-4 by Blonder Tongue Laboratories, and the VSESC-1 "Basic Coax Switch" by Viewsonics, Inc.

Broadband splitters may also be used as blocks 120, 125, 130, and/or 135. These splitters split the signal from their common connector equally to both branch connectors. The splitters also act as combiners and pass a combination of signals on both branch connectors into the common connector. In a preferred embodiment, blocks 120 and 125 are VESC-1 broadband switches and blocks 130 and 135 are SUV-2s splitters made by Blonder Tongue Laboratories, Inc. (stock no. 4002). FIGS. 2 through 10 (described below) show embodiments and configurations of systems 100 using two switches and two splitters, and a system 100 using four switches.

Note that the common and branch connectors do not imply a direction but are connections of the switch/splitter in the "on the shelf condition". However, in connecting these components, a direction through the components is implied. For example, common connection 120Z (125Z) is an input to switch 120 (125) and branch connections 120A and 120B (125A and 125B) are first and second output connections of switch 120 (125), respectively. In addition, branch connections 130A and 130B (135A and 135B) of splitter/switch 130 (135) are first and second input connections to splitter/switch 130 (135), respectively. Also, common connection 130Z (135Z) is an output of splitter/switch 130 (135).

The splitter/switches 120 and 125 are connected to the splitter/switches 130 and 135 in the following manner: the first branch connector 120A of the first splitter/switch 120 is connected to the first branch connector 130A of the third splitter/switch 130. The second branch connector 120B of the first splitter/switch 120 is connected to the second branch connector 135B of the fourth splitter/switch 135. The first branch connector 125A of the second splitter/switch 125 is connected to the first branch connector 135A of the fourth splitter/switch 135. And, the second branch connector 125B of the second splitter/switch 125 is connected to the second branch connector 130B of the third splitter/switch 130. These connections, as well as connections 150 and 155, are made using transmission lines (typically 121) which, in a preferred embodiment, are coaxial cables.

The transmission line 150 connects the common connector 130Z of the third splitter/switch 130 to the first connector 199A of the network component 199. And, in a similar manner, the transmission line 155 connects the common connector 135Z of the fourth splitter/switch 135 to the second connector 199B of the network component 199. In embodiments of the invention where the network component 199 only has one network connector, this network connector is identified as network connector 199A and transmission line 155 is terminated.

Block 170 is an optional controller which controls the blocks 120, 125, 130 and 135 when they are embodied as switches. The controller 170 manages the state of the base switch 100 by controlling the positions of the switches (e.g. 120, 125, 130, and 135) and can switch their common connectors 120Z, 125Z, 130Z, and 135Z to either of their two respective branch connectors. For example, in the case that splitter/switch 130 is a switch instead of a splitter, the controller 170 can change the position of the common connector 130Z from being connected to branch 130A to being connected to branch 130B and vice versa. The controller 170 controls the switches through control lines, typically 171. In a preferred embodiment, the control signal is a +12 VDC current which is passed from the controller 170 to the switches over wires 171. The controller 170 can be a computer, a patch panel of removable jumpers (to connect or disconnect wire contacts manually), a series of push-buttons, or any other known switching mechanism.

Block 160 is an optional power supply which provides power to any components (splitter/switches, or the controller) which require it. Delivery of the power is done through power lines, typically 165.

FIGS. 2 through 5 show various configurations (200, 300, 400, and 500) of a switching system 100 where the first two components (120 and 125) are switches and the second two components (130 and 135) are splitters. Blocks in common with those in FIG. 1 are given the same block number and are described above.

In configuration 200, the first switch 120 is positioned so that its common connector 120Z is connected to its first (A) branch connector 120A. The second switch 125 is also positioned so that its common connector 125Z is connected to its first (A) branch connector 125A. Any signal which is transmitted into the system in configuration 200 at the first network connector 110 will flow through the first switch 120 to the third splitter 130 and into the first connector 199A of the network component (device) 199. For some network components (devices) 199, such as meters, the signals terminate at the device. For other network components (devices) 199, e.g. frequency translators with a single common input and output connector 199A, the signal/energy is used by the network component 199 to create a different signal which is returned through the third splitter 130 and the first switch 120 back to network 110. For still another network component 199, e.g. an amplifier (which has an input connector 199A and a separate output connector 199B), the signal/energy passes through the network component 199 through the fourth splitter 135 and the second switch 125 to network 115.

In similar manner, any signal which is sent into the system configuration 200 through the second network connection 115 will flow through the second switch 125 into the fourth splitter 135 to the network component 199 at its second connector 199B. For some network components (devices) 199, for example meters, the signals terminate at the device. For other network components (devices) 199, e.g. frequency translators, the signal/energy is used by the network component 199 to create a different signal which is returned through the fourth splitter 135 and the second switch 125 back to network 115. For still another network component 199, e.g. a bi-directional amplifier, the signal/energy passes through the network component 199 through the third splitter 130 and the first switch 120 to network 110.

Note again that with the given switch positions of switches 120 and 125, branch connections 120B and 125B are terminated so that no energy (electromagnetic power) flows through these branches.

In configuration 300, the first switch 120 is positioned so that its common connector 120Z is connected to its first (A) branch connector 120A and the second switch 125 is positioned so that its common connector 125Z is connected to its second (B) branch connector 125B. Any signal which is transmitted into the system in configuration 300 at the first network connector 110 will flow through the first switch 120 to the third splitter 130 and into the first connector (199A) of the network component (device) 199. In addition, signals which are sent into the system 100 configuration 300 through the second network connection 115 will flow through the second switch 125 into the third splitter 130 to be combined with the signals from 110 and flow into the network component 199 at its first connector 199A. Therefore, network components 199 that are network terminations, e.g. meters, will read the combined energy from network connections 110 and 115. In other cases, where the network component 199 retransmits energy over the same connector 199A, e.g. a frequency translator with a single common input and output connector 199A, those signals which enter the network component 199 (i.e. the combined signals from network connections 110 and 115) are translated and transmitted to the first connector 199A by the network component 199 will flow through the third splitter 130, into the first switch 120, and out the network connection 110. These signals transmitted by the network component 199 will also be split at the third switch/splitter 130 into the second switch 125 and out the network connection 115. Note that the signals translated and transmitted to network connection 110 (115) will have a component of the signals from network connection 115 (110). The second connector 199B will be terminated at connectors 120B and 125A of the first and second switches (120 and 125), respectively.

In configuration 400, the first switch 120 is positioned so that its common connector 12OZ is connected to its second (B) branch connector 120B and the second switch 125 is positioned so that its common connector 125Z is connected to its first (A) branch connector 125A. Any signal which is transmitted into the system in configuration 400 at the first network connector 110 will flow through the first switch 120 to the fourth splitter 135 and into the network component (device) 199 at terminal 199B. Note that the energy/signals in this configuration 400 are the same as those in configuration 300, however, they enter the network component 199 at the opposite terminal.

In configuration 500, the first switch 120 is positioned so that its common connector 120Z is connected to its second (B) branch connector 120B and the second switch 125 is positioned so that its common connector 125Z is connected to its second (B) branch connector 125B. Any signal which is transmitted into the system 100 in configuration 500 at the first network connector 110 will flow through the first switch 120 to the fourth splitter 135 and into the second connector 199B of the network component (device) 199. Any signal which is sent into the system configuration 500 through the second network connection 115 will flow through the second switch 125 into the third splitter 130 to the network component 199 at its first connector 199A. If the network component 199 is a single directional amplifier (or a frequency translator with separate input and output connections), signals originating at network connection 115 (110) will be amplified and retransmitted to network connection 110 (115). If the network component 199 is a bi-directional amplifier, a signal originating in either network connection 110 or 115 will be amplified according to the specifications of the amplifier and sent to the other network connection 115 or 110). Note that the energy/signals in this configuration 500 are the same as those in configuration 200, however, they enter the network component 199 at the opposite terminals.

Therefore, systems 100 with two switches and two splitters can be positioned to reverse the direction of the signals/energy to and from a network component 199. For example, in configuration 200, where the network component is a bi-directional amplifier, the electromagnetic power flows in the system 100 from network connection 110, to the component at connector 199A, out the connector 199B, and into the network connection 115. Electromagnetic power also flows from network connection 115, to the network component 199 at connector 199B, out the connector 199A, and into the network connection 110. However, when the switches 120 and 125 are positioned as shown in configuration 500, the direction of the signal/energy is reversed. Power flows from 110 to 199B, to 199A, and to 115. Power also flows from 115 to 199A, to 199B, and then to 110.

Configurations 300 and 400 are of less practical use for amplifiers. In configuration 300 with an amplifier at the network device 199, the amplifier would serve little purpose since any signal it amplified from its first connector 199A to its second connector 199B would be terminated at the fourth splitter 135. Similarly, in configuration 400, any signal transmitted by the amplifier 199 to its first connector 199A would go into the terminated third splitter 130. Further, the amplifier 199 may introduce noise into the system 100 since any power which it transmitted to its connected connector (199A in configuration 300, 199B in configuration 400) would be split and sent to the network connections 110 and 115. Note also that there would be a high degree of isolation between network connections 110 and 115 since to reach connection 115 from 110, electromagnetic power would have to flow from one branch of the splitter (130 or 135) to the other branch.

In an alternative embodiment, a meter (such as a spectrum analyzer or signal level meter) is used as the network device 199. In this embodiment, 199A is the RF input connector of the meter 199 and 199B is terminated. In configuration 200, the meter 199 would monitor signals coming into the system 100 from the first network connection 110. In configuration 300, the meter 199 would monitor the signals coming into the system from both network connections 110 and 115. In configuration 400, the input to the meter 199 would be terminated. In configuration 500, the meter 199 would monitor the signals coming into the system from the second network connection 115.

If the meter 199 had two inputs, more intricate monitoring could be performed. The second connector 199B could be connected to the meter's 199 second input. Then, in configuration 200, the meters second input 199B could monitor the signals coming into the system 100 from the second network connection 115. In configuration 300, the meter's second input 199B would be terminated. In configuration 400, the meter's second input 199B could monitor the combination of the signals from 110 and 115. And, in configuration 500, the second input 199B could monitor the signals entering the system 100 at the first network connection 110.

FIGS. 6 through 9 show various configurations (600, 700, 800, and 900) of a switching system 100 where the first two components (120 and 125) are splitters and the second two components (130 and 135) are switches. Blocks in common with those in FIG. 1 are given the same block number and are described above.

Configuration 600 performs the same functions as configuration 200. In configuration 600, the third switch 130 is positioned so that its common connector 130Z is connected to its first (A) branch connector 130A. The fourth switch 135 is also positioned so that its common connector 135Z is connected to its first (A) branch connector 135A. Any signal which is transmitted into the system 100 in configuration 600 at the first network connector 110 will flow through the first splitter 120 to the third switch 130 and into the first connector 199A of the network component (device) 199. Signals which are transmitted by the network component 199 to its first connector 199A will flow through the third switch 130, into the first splitter 120, and out the first network connection 110. Further, any signal which is sent into the system configuration 200 through the second network connection 115 will flow through the second splitter 125 into the fourth switch 135 to the network component 199 at its second connector 199B. Signals which are transmitted by the network component 199 through its second connector 199B will be sent to network connection 115.

In configuration 700, the third switch 130 is positioned so that its common connector 130Z is connected to its first (A) branch connector 130A and the fourth switch 135 is positioned so that its common connector 135Z is connected to its second (B) branch connector 135B. Signals entering the system 100 at the first network connection 110 will be split by the first splitter 120 and be sent through the third switch 130 and the fourth switch 135 to connectors 199A and 199B of the network device 199, respectively. Signals which are transmitted by the network device 199 to either connection (199A and 199B) will be combined at the first splitter 120 and flow to the first network connection 110. Both branch connections 125A and 125B of the second splitter 125 will be terminated due to the self-terminating properties of the third and fourth switches 130 and 135. Hence, the second network connection 115 will be terminated at the second splitter 125.

In configuration 800, the third switch 130 is positioned so that its common connector 130Z is connected to its second (B) branch connector 130B and the fourth switch 135 is positioned so that its common connector 135Z is connected to its first (A) branch connector 135A. Signals entering the system 100 at the first network connection 110 will be terminated at the first splitter 120. Signals entering the system 100 at the second network connection 115 will be split by the second splitter 125 and be sent by the third switch 130 and by the fourth switch 135 to connectors 199A and 199B of the network device 199, respectively. Signals which are transmitted by the network device 199 to either connection (199A and 199B) will be combined at the second splitter 125 and flow to the second network connection 115.

Configuration 900 performs the same functions as configuration 500. In configuration 900, the third switch 130 is positioned so that its common connector 130Z is connected to its second (B) branch connector 130B and the fourth switch 135 is positioned so that its common connector 135Z is connected to its second (B) branch connector 135B. Any signal which is transmitted into the system 100 in configuration 900 at the first network connector 110 will flow through the first splitter 120 to the fourth switch 135 and into the second connector 199B of the network component (device) 199. Likewise, signals which are transmitted by the network component 199 to its second connector 199B will flow through the fourth switch 135, into the first splitter 120, and out network connection 110. Any signal which is sent into the system configuration 900 through the second network connection 115 will flow through the second splitter 125 into the third switch 130 to the network component 199 at its first connector 199A. Signals which are transmitted by the network component 199 through its first connector 199A will be sent to network connection 115.

In an alternative embodiment, a frequency translator is used as the network device 199. In this embodiment, 199A is the input connector of the frequency translator 199 and 199B is its output connector. A frequency translator listens for signals within a specified bandwidth and up-converts (or down-converts) them into another band. In configuration 600, the frequency translator 199 would translate signals coming into the system 100 from the first network connection 110 and transmit the translated signals onto the second network connection 115. Similarly, in configuration 900, the frequency translator 199 would translate signals coming into the system 100 from the second network connection 115 and transmit the translated signals to the first network connection 110. When the system 100 was put into configuration 700, the frequency translator 199 would translate the signals coming into the system from the first network connection 110 and send the translated signals back onto the first network connection 110; the second network connection 115 being terminated. And, when the system 100 was put into configuration 800, the frequency translator 199 would translate the signals coming into the system from the second network connection 115 and send the translated signals back onto the second network connection 115; the first network connection 110 being terminated.

Figure 10:
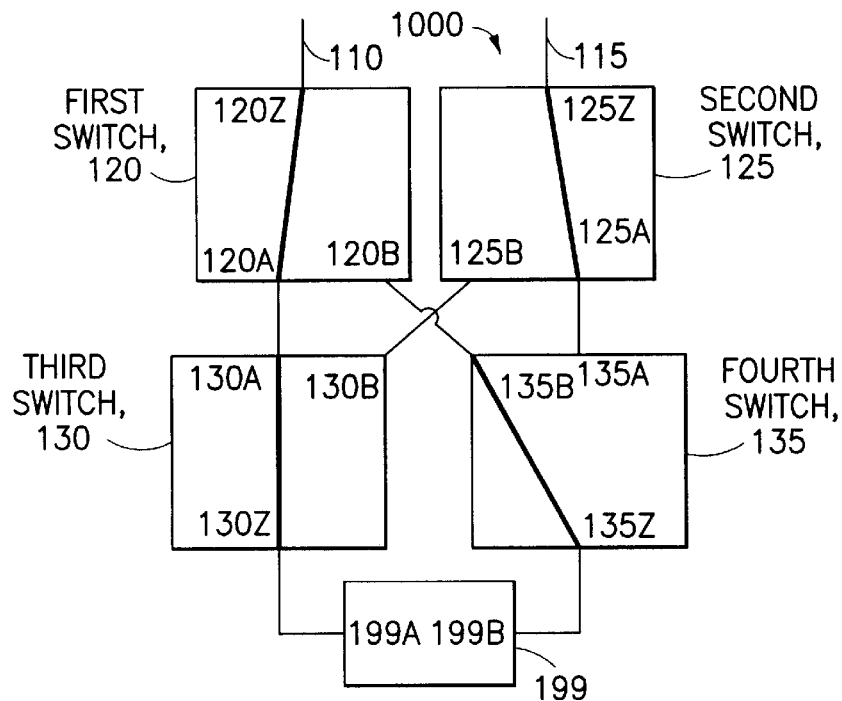
FIG. 10 shows a configuration of a switching system using four switches.

FIG. 10 shows a configuration 1000 of a switching system 100 where the four components 120, 125, 130 and 135 are switches. This configuration 1000 shows how one connector 199A of the network device 199 can be connected to the first network connection 110 while at the same time the second network connection 115 is terminated. In configuration 1000, the first switch 120 is positioned so that its common connector 120Z is connected to its first (A) branch connector 120A. The second switch 125 is positioned so that its common connector 125Z is connected to its first (A) branch connector 125A. The third switch 130 is positioned so that its common connector 130Z is connected to its first (A) branch connector 130A. And, the fourth switch 135 is positioned so that its common connector 135Z is connected to its second (B) branch connector 135B. Signals entering the system 100 at the first network connection 110 are sent by the first switch 120 into the third switch 130 and to the first connector 199A of the network device 199. Signals transmitted on the first connector 199A of the network device 199 are sent to the first network connection 110. Both the network connection 115 and the connector 199B are terminated. Note that the second switch 125 could also be positioned so that it connected its common connector 125Z to its second (B) branch connector 125B and the system 100 would still have the same connectivity. The second network connection 115 would still be terminated. In an alternative embodiment where the network device 199 is a signal generator such as a tone generator or other type of modulator, this configuration 1000 allows the network device 199 to be electrically connected to the first network connection 110 and electrically disconnected to the second network connection 115.

Figure 11:
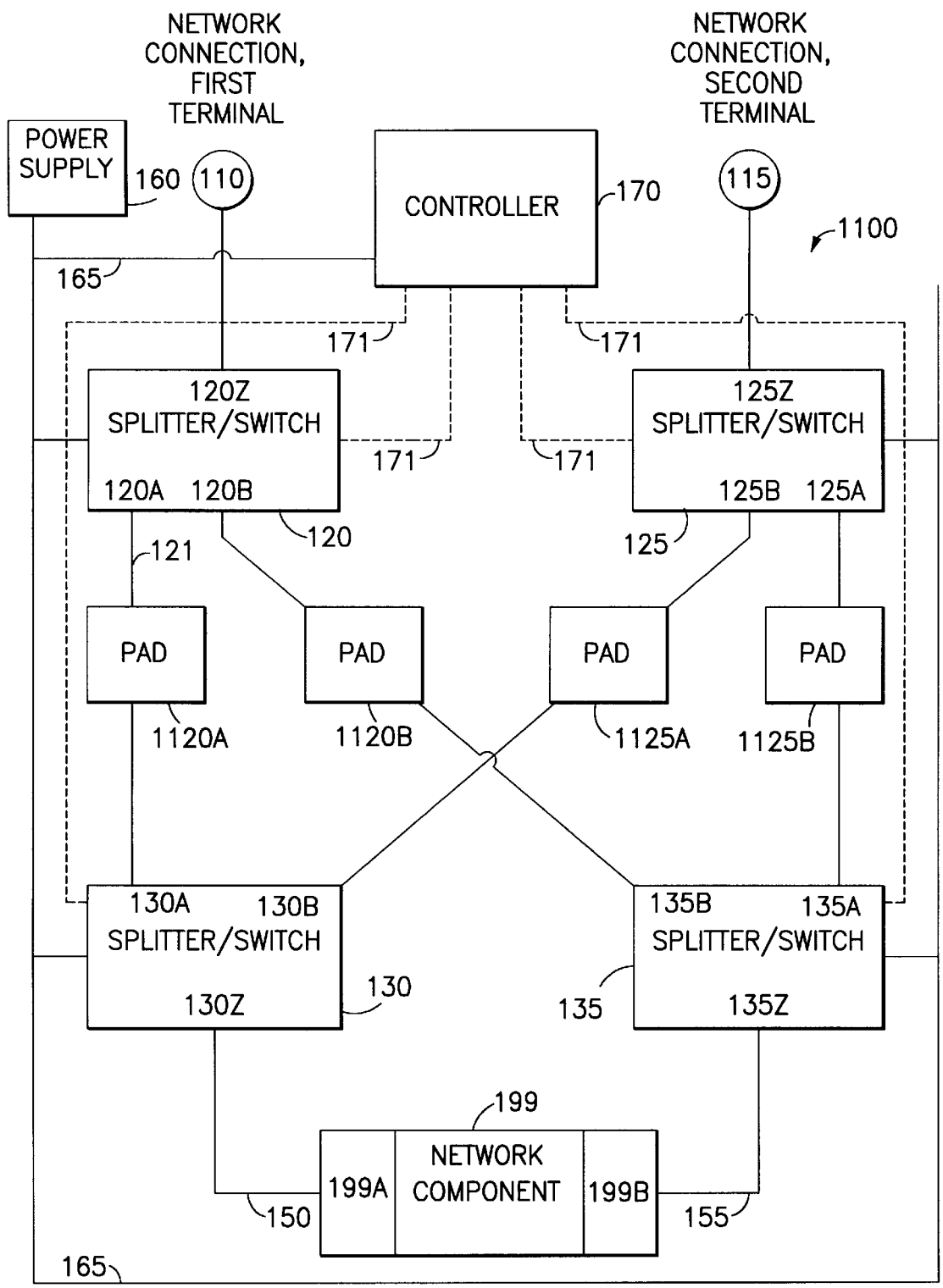
FIG. 11 is a block diagram of a system of broadband switches that permits changing the flow of electromagnetic power of broadband signals by remote or local control with attenuation pads in one or more of the connecting lines.

FIG. 11 is a block diagram of a system 1100 of broadband switches and/or splitters that permits changing and/or reversing directions of broadband signal energy by remote or local control with attenuation pads in one or more of the connecting lines (typically 121). (Note that blocks in common with those in FIG. 1 are given the same block number and are described above.) Use of attenuation pads (1120A, B and 1125A, B) allows the broadband network to remain balanced, using techniques well known in the art, as the state of the base switch 1100 is changed.

The network connections 110 and 115 will typically be connected to broadband networks of differing configurations. For example, one network connection 110 may be connected to one mile of coaxial cable which in turn is connected to a broadband amplifier while the other network connection 115 may be connected to five miles of coaxial cable and a system of broadband taps and splitters. These network connections have different electrical characteristics which need to be accounted for. Blocks 1120A, 1120B, 1125A, and 1125B are pads which optionally contain attenuators and/or equalizers. Each pad can contain a set of attenuators and/or equalizers to balance the characteristics of the network connections 110, 115 when they are switched to connect with the connectors (199A and 199B) of the network component 199. In a preferred embodiment, the pads (1120A, 1120B, 1125A, and 1125B) are the "Plug-in Pads" and/or Forward and Reverse Equalizers, part number 88D117Z, which are made by Scientific Atlanta. These pads allow attenuation and equalization settings to be manually inserted, removed, and changed for service while the system 1100 is installed and operating a broadband network.

Figure 12:
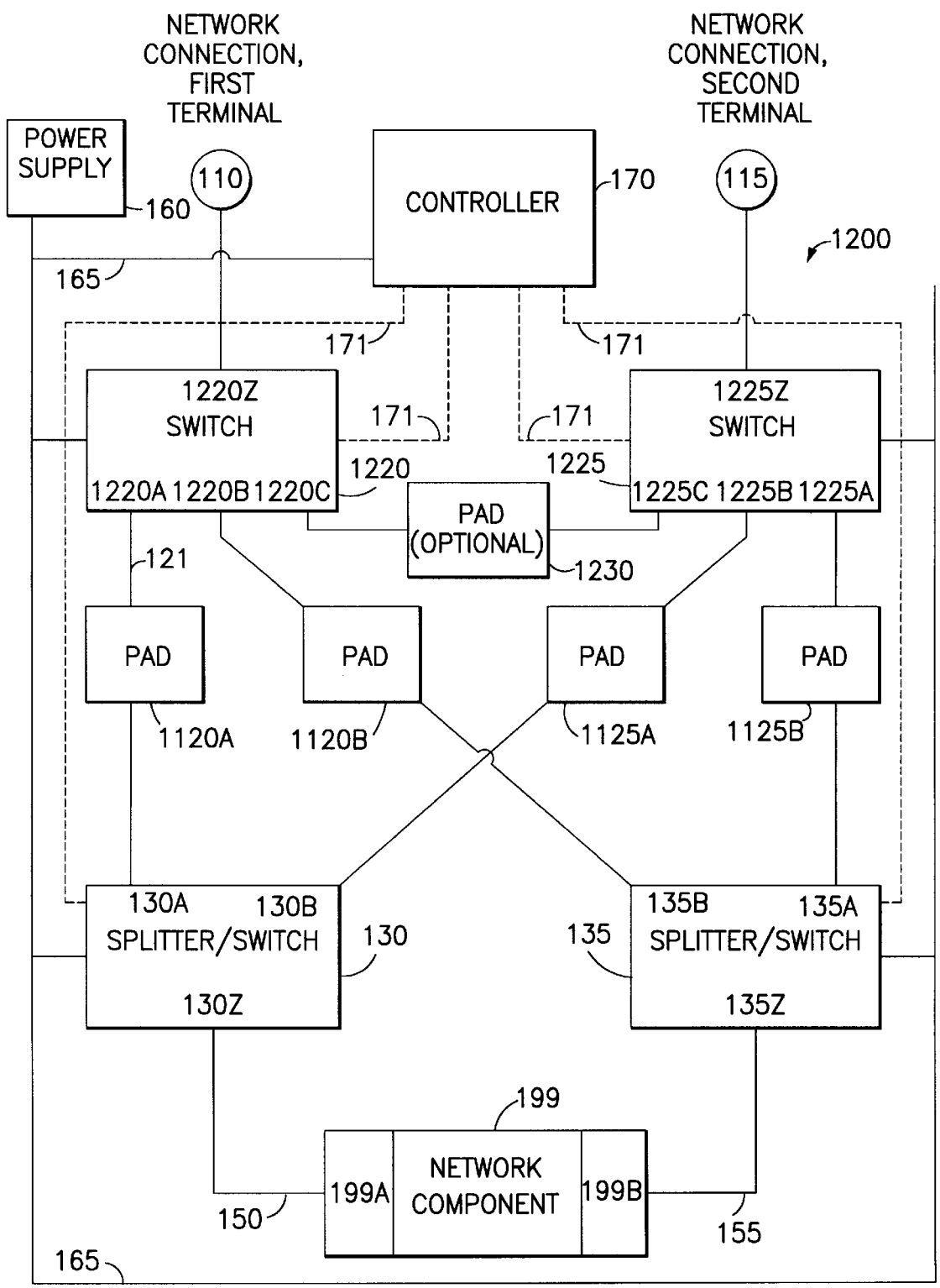
FIG. 12 is a block diagram of a system of broadband switches that permits components to be bypassed.

FIG. 12 is a block diagram of a system 1200 of broadband switches that permits components to be bypassed. (Blocks in common with those in FIG. 11 are given the same block number and are described above.) This system 1200 uses two broadband switches 1220, 1225 which are capable of connecting a common connector to any one of three branch connectors (e.g. 1220A, 1220B, 1220C). Branch connectors 1220A (1225A) and 1220B (1225B) are the same as branch connectors 120A (125A) and 120B (125B) described above. Connections made through these branch connectors (1220A, 1225A, 1220B, 1225B) are described above. The third branch connectors (1220C and 1225C) are used to create a connection between network connections 110 and 115 which bypass the network component 199 entirely.

The network connections 110, 115 each are connected to broadband switches (1220 and 1225, respectively). These switches 1220, 1225 have one common connector 1220Z, 1225Z and three branch connectors (1220A, 1220B, and 1220C; and 1225A, 1225B, and 1225C, respectively). The switches are capable of electrically connecting their respective common connectors to any one of their branch connectors. Switches such as these are well known. The third branch connectors 1220C, 1225C are connected to each other through an optional pad 1230. In a preferred embodiment, the first three branch connectors of the eight-way "ClearPath Test Point Selector" (TPS) made by Electroline Systems, Inc. are used as the branch connectors of the broadband switches 1220 and 1225.

Figure 13:
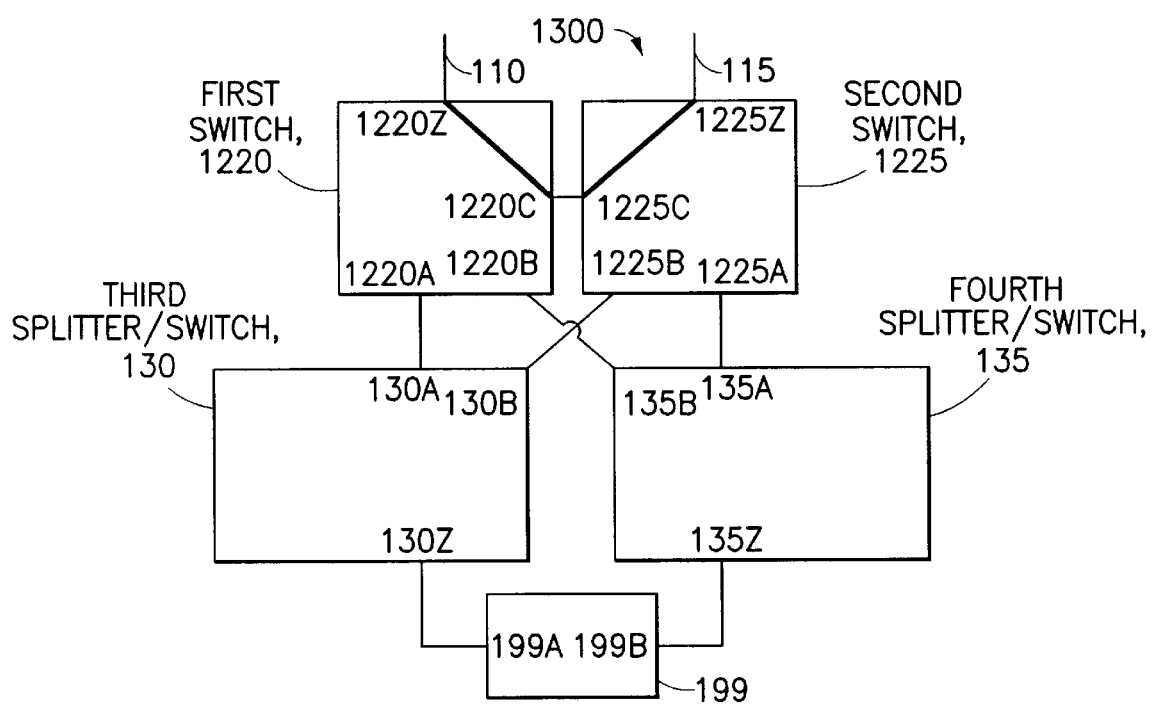
FIG. 13 shows the configuration of a switching system set to bypass its component.

FIG. 13 shows a configuration 1300 of a switching system 1200 where the first two components 1220, 1225 are three-way switches as described in FIG. 12 and the third and fourth components (130 and 135) are splitters and/or switches. In configuration 1300, the first switch 1220 is positioned so that its common connector 1220Z is connected to its third (C) branch connector 1220C. The second switch 1225 is positioned so that its common connector 1225Z is connected to its third (C) branch connector 1225C. Signals entering the system 100 on the first network connection 110 pass through the first switch 1220 into the second switch 1225 and out the second network connection 115. Signals entering the system 100 on the second network connection 115 pass through the second switch 1225 into the first switch 1220 and out the first network connection 110. This configuration 1300 is used to bypass a network component 199. Suppose, for example, that the network component 199 was an amplifier, the first network connection was connected to a short (10 feet) run of cable, and the second network connection was connected to a long (5 mile) run of cable. An amplifier 199 could be used to amplify signals coming into the system 100 from the short run of cable 110 so that they could be transmitted over the long run 115. It would not make sense for the inputs to the amplifier, in this case, to be reversed. If the system 100 was configured as shown in 500, for example, the amplifier would amplify signals which had traveled five miles and transmit an overly strong amplified signal ten feet. In cases such as this, it is better for the signals to bypass the amplifier entirely through configuration 1300.

Given this disclosure alternative equivalent embodiments will become apparent to those skilled in the art. These embodiments are also within the contemplation of the inventors.

We claim:

1. A switching system for a broadband network operating above five megahertz, comprising:
    a network connection with a first and second network terminal;
    a device with a first device terminal and a second device terminal;
    a first component with a first common connector, a first A branch, and a first B branch, the first common connector connected to the first network terminal;
    a second component with a second common connector and a second A branch and a second B branch, the second common connector connected to the second network terminal;
    a third component with a third A branch, a third B branch, and one third common connector, the third A branch connected to the first A branch, the third B branch connected to the second B branch, and the third common connector connected to the first device terminal;
    a fourth component with a fourth A branch, a fourth B branch, and a fourth common connector, the fourth B branch connected to the first B branch, the fourth common connector connected to the second device terminal, the fourth A branch connected to the second A branch;
    one or more of the first, second, third and fourth components being configured to change the flow of electromagnetic power through the first and second device terminals.

2. A switching system, as in claim 1, where the first component and the second component are switches, the third component and the fourth component are splitters.

3. A switching system, as in claim 2, where the first common connector is connected to the first A branch and the second common connector is connected to the second A branch, and the electromagnetic power flows from the first network terminal through the first device terminal, through the device, to the second device terminal, and then to the second network terminal.

4. A switching system, as in claim 2, where the first common connector is connected to the first A branch and the second common connector is connected to the second A branch, and the electromagnetic power flows from the first network terminal through the first device terminal, to the device being a frequency translator, and is retransmitted back through the third splitter and the first switch to the first network terminal.

5. A switching system, as in claim 2, where the first common connector is connected to the first A branch and the second common connector is connected to the second A branch, and the electromagnetic power flows from the first network terminal into the first device terminal and then is absorbed by the device.

6. A switching system, as in claim 2, where the first common connector is connected to the first A branch and the second common connector is connected to the second B branch, and the electromagnetic power from the first and second network terminals are combined at the third component and flow to the first device terminal, the second device terminal being terminated.

7. A switching system, as in claim 2, where the first common connector is connected to the first B branch and the second common connector is connected to the second A branch, and the electromagnetic power from the first and second network terminals are combined at the fourth component and flow to the second device terminal, the first device terminal being terminated.

8. A switching system, as in claim 2, where the first common connector is connected to the first B branch and the second common connector is connected to the second B branch, and the electromagnetic power flows from the first network terminal through the second device terminal, through the device, to the first device terminal, and then to the second network terminal.

9. A switching system, as in claim 2, where the first common connector is connected to the first B branch and the second common connector is connected to the second B branch, and the electromagnetic power flows from the first network terminal through the second device terminal, to the device being a frequency translator, and is retransmitted back through the fourth splitter and the first switch to the first network terminal.

10. A switching system, as in claim 2, where the first common connector is connected to the first B branch and the second common connector is connected to the second B branch, and the electromagnetic power flows from the first network terminal through the second device terminal and then is absorbed by the device.

11. A switching system, as in claim 1, where the device is any one or more of the following: amplifier, tap, meter, frequency translator, attenuator, equalizer.

12. A switching system, as in claim 1, where the first component and the second component are splitters, the third component and the fourth component are switches.

13. A switching system, as in claim 12, where the third A branch is connected to the third common connector and the fourth A branch is connected to the fourth common connector.

14. A switching system, as in claim 12, where the third A branch is connected to the third common connector and the fourth B branch is connected to the fourth common connector, and the electromagnetic power from the first network terminal is split by the first component to flow to both the first device terminal and the second device terminal, the second network terminal being terminated.

15. A switching system, as in claim 12, where the third B branch is connected to the third common connector and the fourth A branch is connected to the fourth common connector, and the electromagnetic power from the second network terminal is split by the second component to flow to both the first device terminal and the second device terminal, the first network terminal being terminated.

16. A switching system, as in claim 12, where the third B branch is connected to the third common connector and the fourth B branch is connected to the fourth common connector.

17. A switching system, as in claim 1, where the first, second, third and fourth components are switches.

18. A switching system, as in claim 17, where the first A branch is connected to the first common connector, the second A branch is connected to the second common connector, the third A branch is connected to the third common connector, and the fourth B branch is connected to the fourth common connector, and the electromagnetic power flows from the first network terminal through the first device terminal, to the device, the second device terminal and the second network terminal are terminated.

19. A switching system, as in claim 18, where the electromagnetic power flows from the device, through the first device terminal, through the third and first switch, to the first network terminal, the second device terminal and the second network terminal are terminated.

20. A switching system, as in claim 19, where the device is a frequency translator, and electromagnetic power flows from the first network terminal to the first device terminal and is retransmitted back through the third and first switches to the first network terminal, the second device terminal and the second network terminal are terminated.

21. A switching system, as in claim 1, where the first component has an additional first C branch and the second component has an additional second C branch, the first C branch being connected to the second C branch, and when the first common connector is connected to the first C branch and the second common connector is connected to the second C branch, the switching system is bypassed.

22. A switching system, as in claim 21, where the first C branch is connected to the second C branch through any one of the following: attenuator, equalizer, band-pass filter, band-trap filter.

23. A switching system, as in claim 1, where an attenuation device is connected between the first A branch and the third A branch, the first B branch and the fourth B branch, the second A branch and the fourth A branch, the second B branch and the third B branch.

24. A switching system, as in claim 23, where the attenuation device is any one or more of the following: attenuator, equalizer, band-pass filter, band-trap filter.

* * * * *